(12) United States Patent
Sigut et al.

(10) Patent No.: US 11,963,470 B2
(45) Date of Patent: *Apr. 23, 2024

(54) AGRICULTURAL DEVICE FOR PROCESSING SOIL WITH TWO SETS OF WORKING ROLLERS

(71) Applicant: BEDNAR FMT s.r.o., Prague (CZ)

(72) Inventors: Jakub Sigut, Prague (CZ); Pavel Syrovatka, Klenec-Roudnice nad Labem (CZ); Jan Bednar, Prague (CZ)

(73) Assignee: BEDNAR FMT s.r.o., Prague (CZ)

( * ) Notice: Subject to any disclaimer, the term of this patent is extended or adjusted under 35 U.S.C. 154(b) by 0 days.

This patent is subject to a terminal disclaimer.

(21) Appl. No.: 18/171,631

(22) Filed: Feb. 20, 2023

(65) Prior Publication Data

US 2023/0200274 A1 Jun. 29, 2023

Related U.S. Application Data

(63) Continuation of application No. 16/745,341, filed on Jan. 17, 2020, now Pat. No. 11,696,522.

(30) Foreign Application Priority Data

Feb. 4, 2019 (EP) ..................................... 19155207

(51) Int. Cl.
*A01B 29/04* (2006.01)
*A01B 3/28* (2006.01)
(Continued)

(52) U.S. Cl.
CPC ................ *A01B 29/04* (2013.01); *A01B 3/28* (2013.01); *A01B 49/027* (2013.01); *A01B 73/044* (2013.01)

(58) Field of Classification Search
CPC .. A01B 3/28; A01B 3/32; A01B 29/04; A01B 49/027; A01B 73/044
See application file for complete search history.

(56) References Cited

U.S. PATENT DOCUMENTS

| 6,293,354 | B1 | 9/2001 | Garratt et al. |
| 7,048,069 | B1 | 3/2006 | Ruckle |
| 2004/0245004 | A1 | 12/2004 | Bollich |

FOREIGN PATENT DOCUMENTS

| DE | 3541543 | 11/1985 |
| DE | 102014104417 B3 | 2/2015 |

(Continued)

OTHER PUBLICATIONS

European Patent Office, European Search Report, dated Jul. 19, 2019, in EP19155207, filed Feb. 4, 2018.

(Continued)

*Primary Examiner* — Tara Mayo
(74) *Attorney, Agent, or Firm* — Thedford I. Hitaffer; Hitaffer & Hitaffer, PLLC (57) ABSTRACT

An agricultural device for soil processing with two sets of working rollers comprises a supporting frame, which comprises a central part, a left wing and a right wing. The left and right wings are rotatably attached to the central part. At least two rows of working units are attached to the supporting frame. The working units are arranged in regular distances in every row. A left set of rollers is attached to the left wing and a right set of rollers is attached to the right wing. The sets of rollers are divided into front rollers and rear rollers and provided with attachments and discs. The discs on the sets are located between these attachments. The number of discs of rear rollers differs exactly by one disc from the number of discs of front rollers. The distances between individual discs are the same along the whole width (Continued)

of the agricultural device. The discs of front rollers are located in the same plane as the working units.

6 Claims, 11 Drawing Sheets (51) Int. Cl.
*A01B 49/02* (2006.01)
*A01B 73/04* (2006.01)

(56) References Cited

FOREIGN PATENT DOCUMENTS

| | | |
|---|---|---|
| DE | 102016115319 A1 | 2/2018 |
| DE | 102016010270 A1 | 3/2018 |
| EP | 2832198 A1 | 4/2015 |
| WO | 2015014345 A1 | 2/2015 |

OTHER PUBLICATIONS

US Patent and Trademark Office, Office Action, dated Sep. 27, 2021, in related U.S. Appl. No. 16/745,341, filed Jan. 17, 2020.
US Patent and Trademark Office, Office Action, dated Feb. 22, 2022, in related U.S. Appl. No. 16/745,341, filed Jan. 17, 2020.
US Patent and Trademark Office, Office Action, dated Sep. 21, 2022, in related U.S. Appl. No. 16/745,341, filed Jan. 17, 2020.

AGRICULTURAL DEVICE FOR PROCESSING SOIL WITH TWO SETS OF WORKING ROLLERS

CROSS-REFERENCE TO RELATED APPLICATIONS

This application is a continuation of U.S. patent application Ser. No. 16/745,341, filed on Jan. 17, 2020, which claims priority to EP Application No. 19155207, filed on Feb. 4, 2019, the disclosures of which are incorporated herein by reference.

BACKGROUND OF THE INVENTION

The invention relates to working rollers of an agricultural device which are asymmetric in terms of the construction and the number of discs. Agricultural devices with operating units for soil processing (e.g., ploughshares) should be arranged so that each operating unit mounted to the supporting frame of the agricultural device corresponds with exactly one disc of the front part of the roller, or the disc and the operating unit are located in the same plane. Seeds are put into a freshly ploughed furrow created by the operating units and are slightly pushed into the soil by the subsequent overrun of the discs. The remaining discs located on the rear part of the roller without a corresponding operating unit then run over the created furrow and level the piled-up soil. Thanks to this processing, suitable placement of seeds in the soil, their pushing and covering by freshly processed soil is ensured.

The agricultural devices with a narrow operating width, which do not need to be folded in order to meet the standard width requirements for transport of an agricultural device on roads, use a single continuous working roller divided into a front part and a rear part, wherein this roller is attached to the device frame, thus this device performs its function completely, or the soil is evenly processed along the whole width of the agricultural device.

With wider operating width, the agricultural device in its unfolded state cannot be transported on roads and it is necessary to divide the structure frame into a central part and a left wing and a right wing, wherein these wings are rotatably attached to the central part to allow folding of the whole structure. Therefore, it is necessary to use at least two rear rollers, wherein the left rear roller is mounted to the left wing of the structure and the right rear roller is mounted to the right wing of the structure. However, using this structure, a gap in which no disc is located appears in between the rollers, therefore the discs are not arranged in regular distances along the whole operating width of the agricultural device. In the place with a missing disc, the soil is improperly processed, which leads to poor growth of crops in this place (i.e., economic losses in the long term). This structural deficiency can be found in the document DE102016115319 A1, in which two sets of rollers (reference sign 40) are located in the rear part of the agricultural device. There is a gap between the discs, between the left set of rollers and the right set of rollers, which fails to correspond with the distance interval between other discs.

Therefore, there exists a need for an agricultural device in which the rear rollers are provided with discs and arranged in such way that soil is evenly processed along the whole operating width of the agricultural device.

SUMMARY OF THE INVENTION

The above-mentioned drawbacks are, at least partially, eliminated by an agricultural device for soil processing having two sets of working rollers comprising a supporting frame which comprises a central part, a left wing and a right wing, wherein the left and right wing are rotatably connected to the central part, at least two sets of working units mounted to the supporting frame, wherein in every row, the working units are arranged in regular distances, the left set of rollers mounted to the left wing and the right set of rollers mounted to the right wing, wherein the sets are divided into a front roller and a rear roller and provided with attachments and discs located between these attachments, wherein the discs of the front rollers are located in the same plane as the working units. The number of discs of the rear rollers differs from the number of discs of the front rollers exactly by one disc and the distances between individual discs are the same along the whole width of the agricultural device.

The agricultural device is designed in such a way that the left set of rollers and the right set of rollers have different number of discs and different length. The sets of rollers are provided with attachments, between which the discs are located. One set of rollers is provided with a disc that is located on the inner side of the attachment, wherein the distance of this disc from the nearest discs corresponds with the distance between discs. This disc can be part of the front roller of the right set of rollers, or the front roller of the left set of rollers, or the rear roller of the right set of rollers, or the rear roller of the left set of rollers.

In a preferred embodiment, the total number of discs is thirty-nine and working units nineteen. A working unit can be a ploughshare or a chisel and the agricultural device is provided with three rows of working units.

In a preferred embodiment, the agricultural device is then provided with at least one wheel that makes the transport of the agricultural device easier on roads.

BRIEF DESCRIPTION OF THE DRAWINGS

The summary of the invention is further shown by examples of its embodiment, which are described means of the attached drawings, in which.

DETAILED DESCRIPTION OF THE PREFERRED EMBODIMENT

Figure 1:
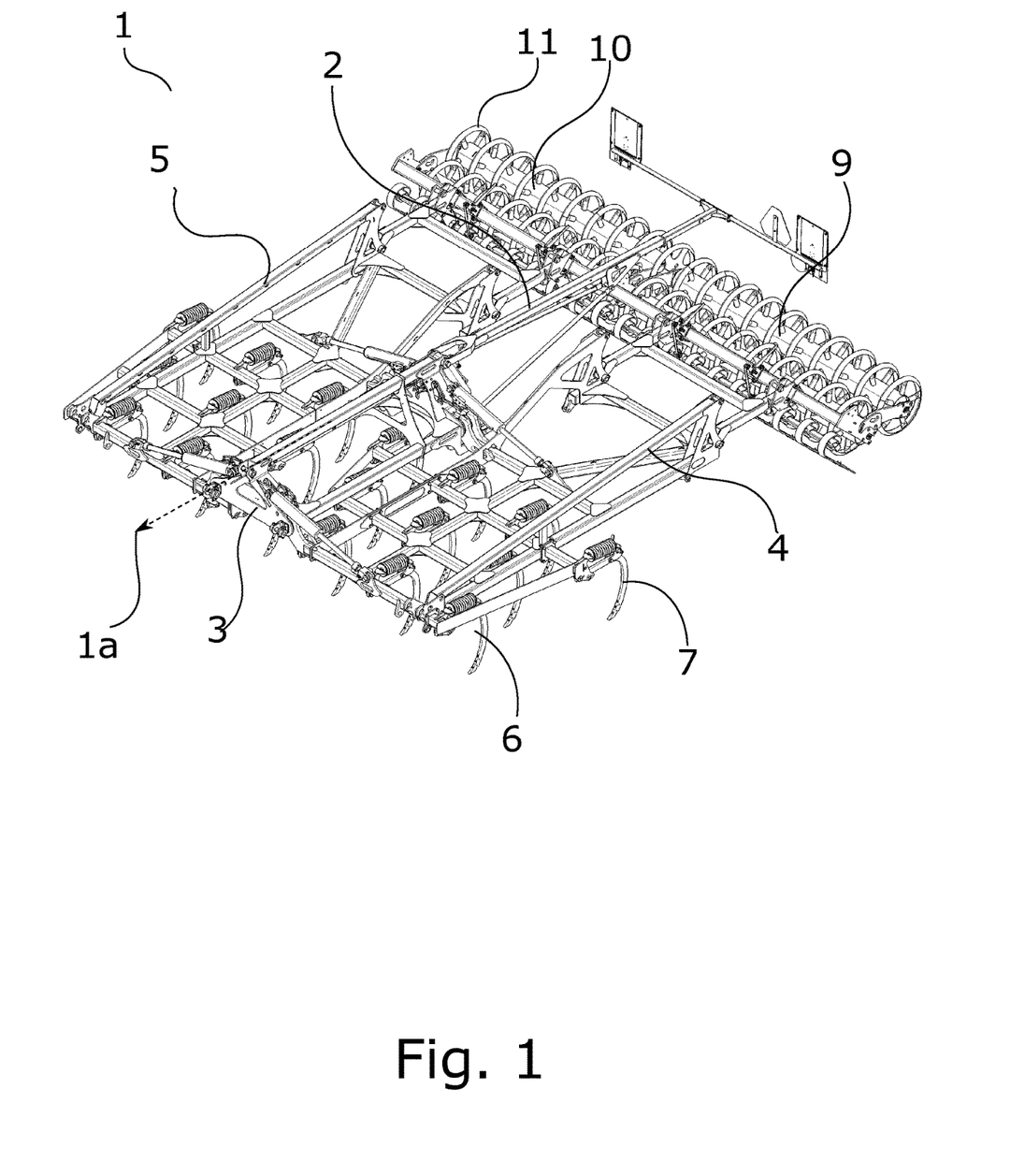
FIG. 1 shows the whole structure of the agricultural device.
Figure 2:
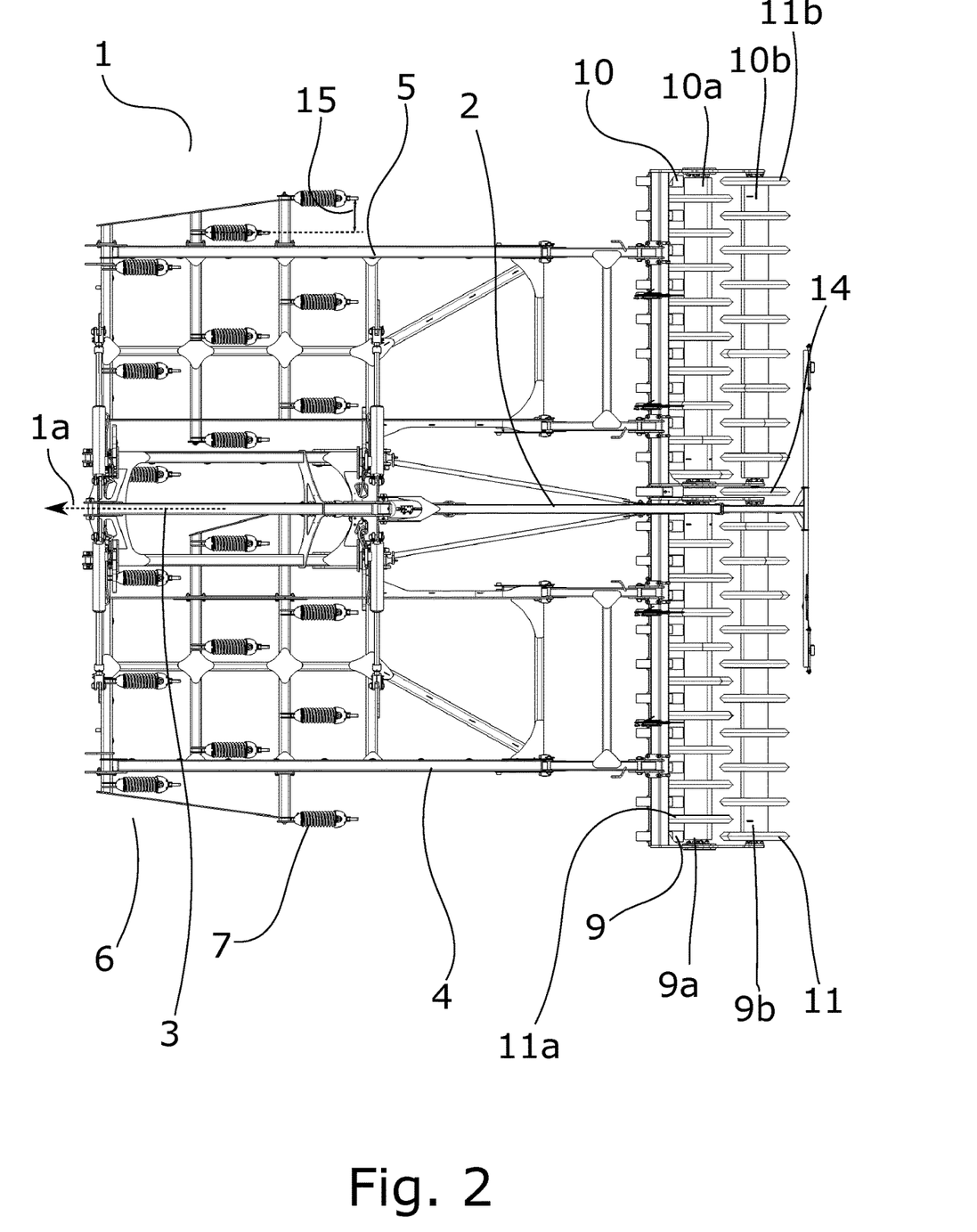
FIG. 2 shows a top view of the structure of the agricultural device.
Figure 3:
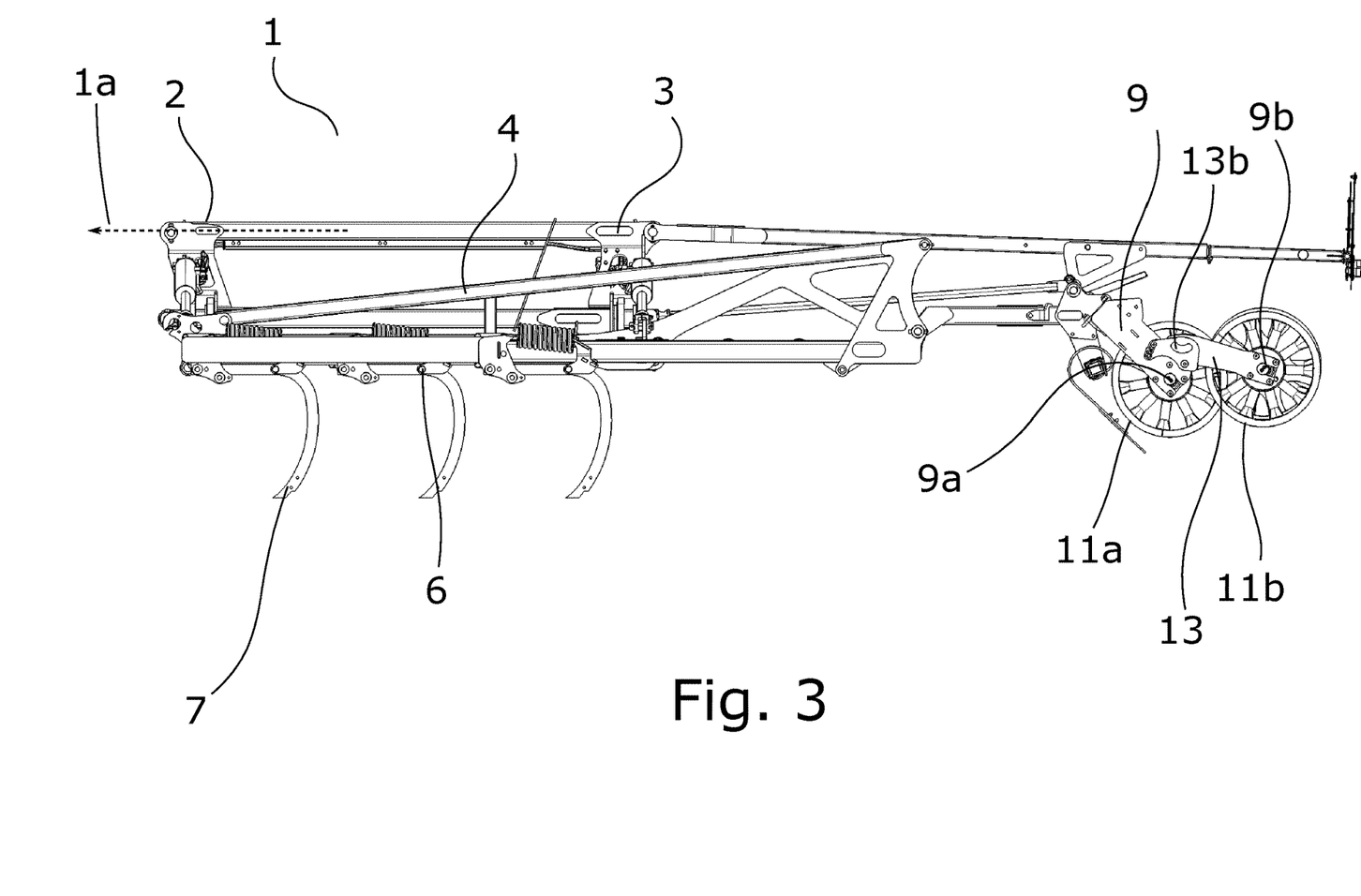
FIG. 3 shows a left side view of the structure of the agricultural device.
Figure 4:
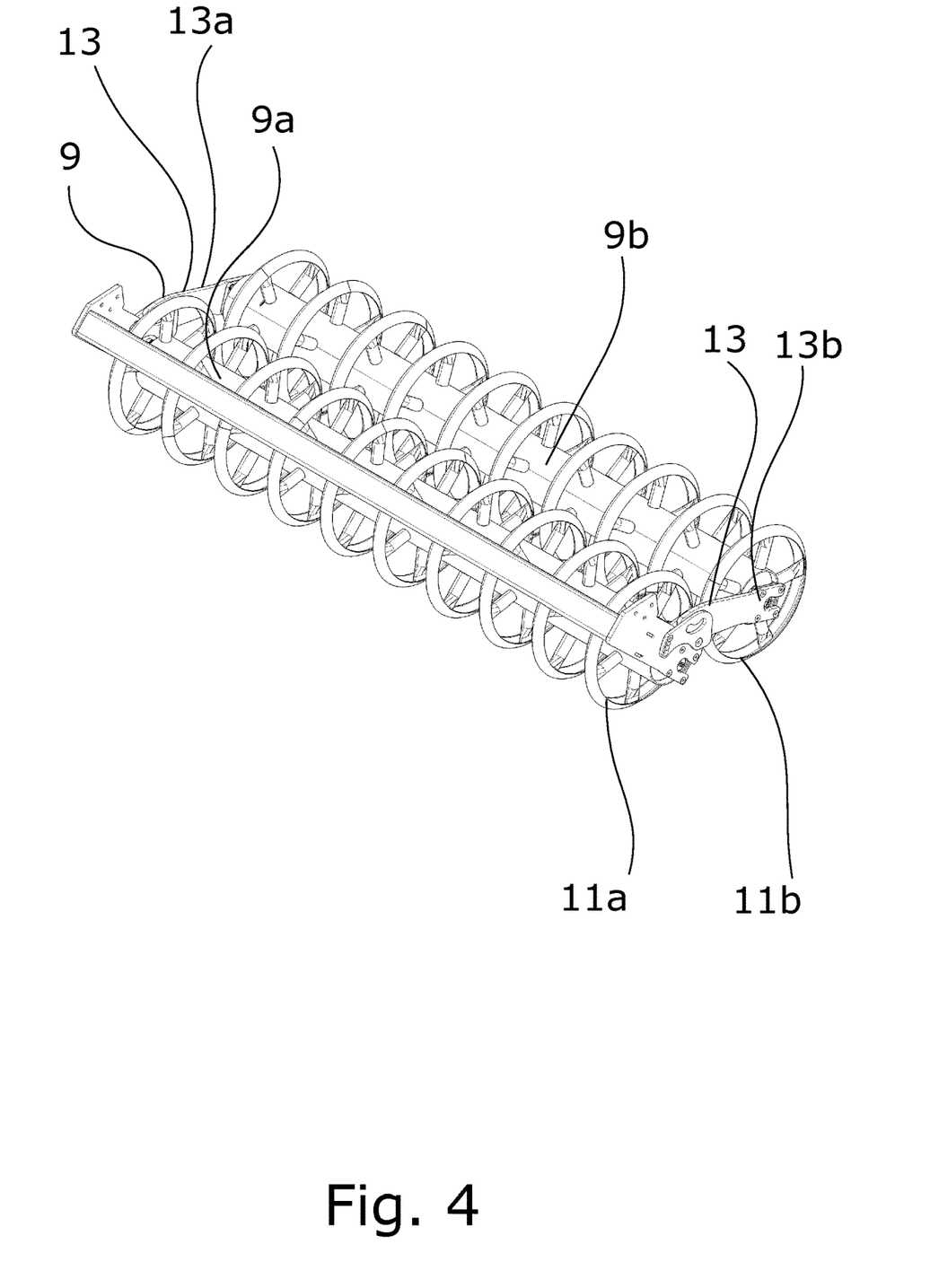
FIG. 4 shows the left set of rollers of the agricultural device.
Figure 5:
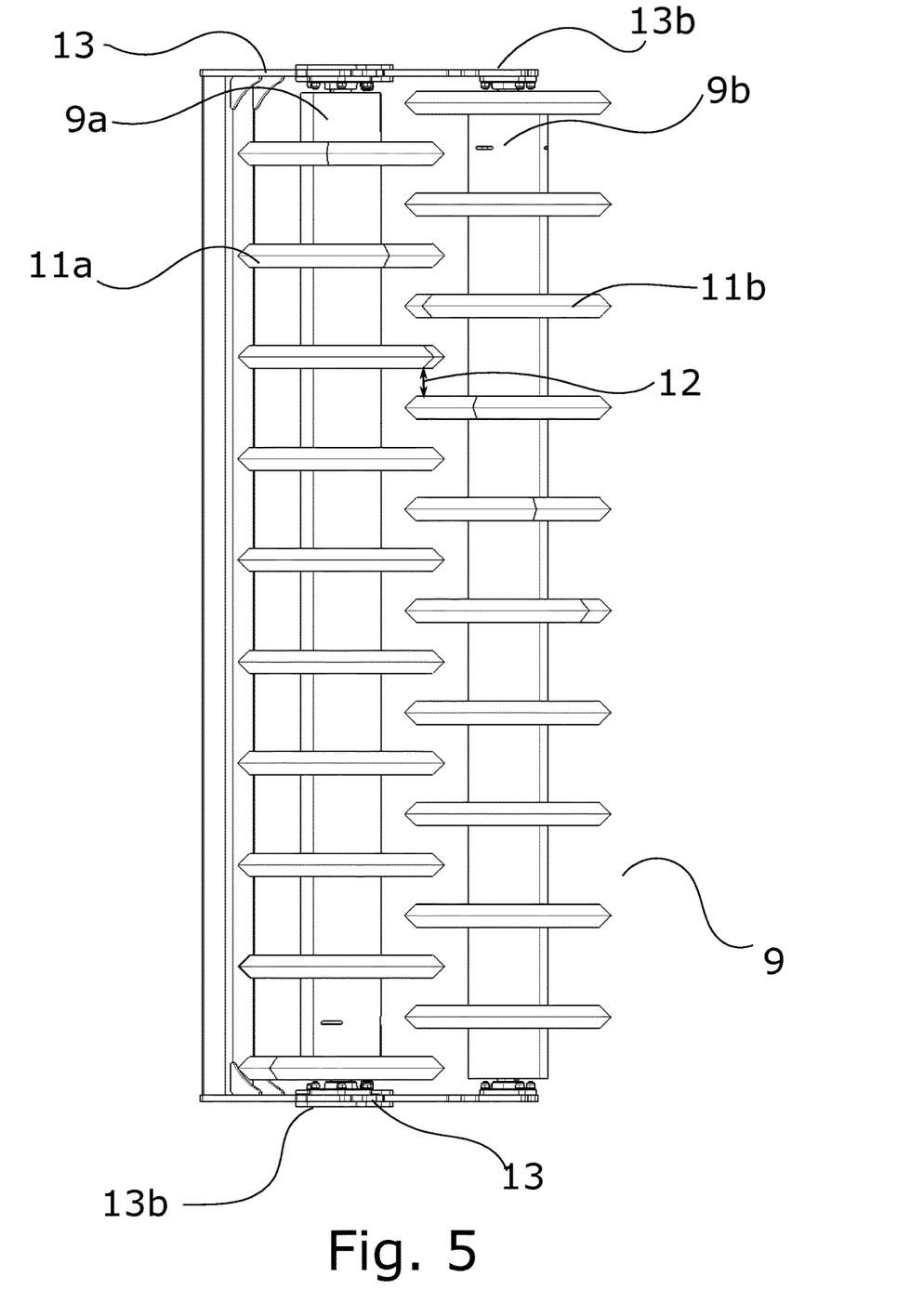
FIG. 5 shows a bottom view of the left set of rollers of the agricultural device.
Figure 6:
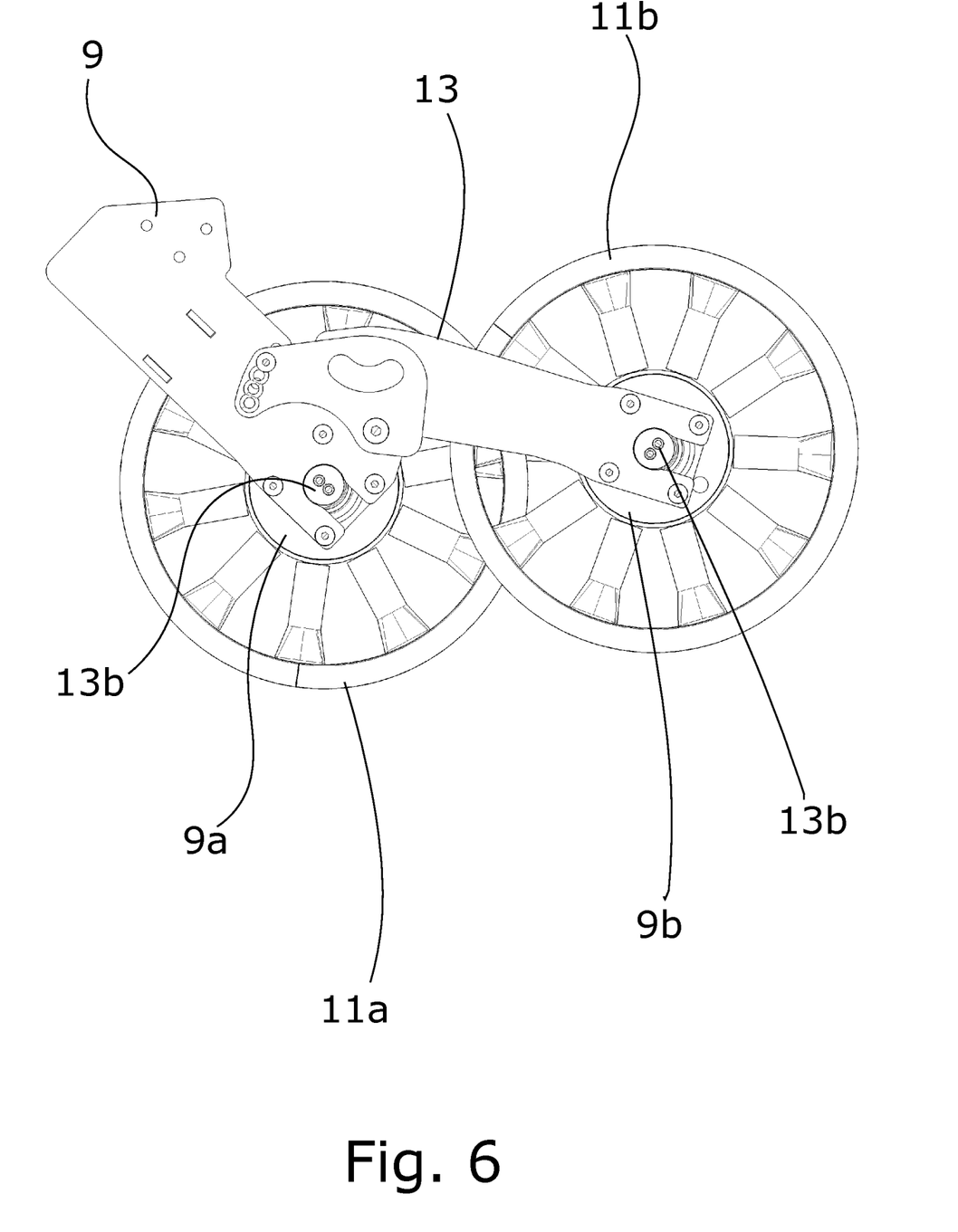
FIG. 6 shows a side view of the left set of rollers of the agricultural device.
Figure 7:
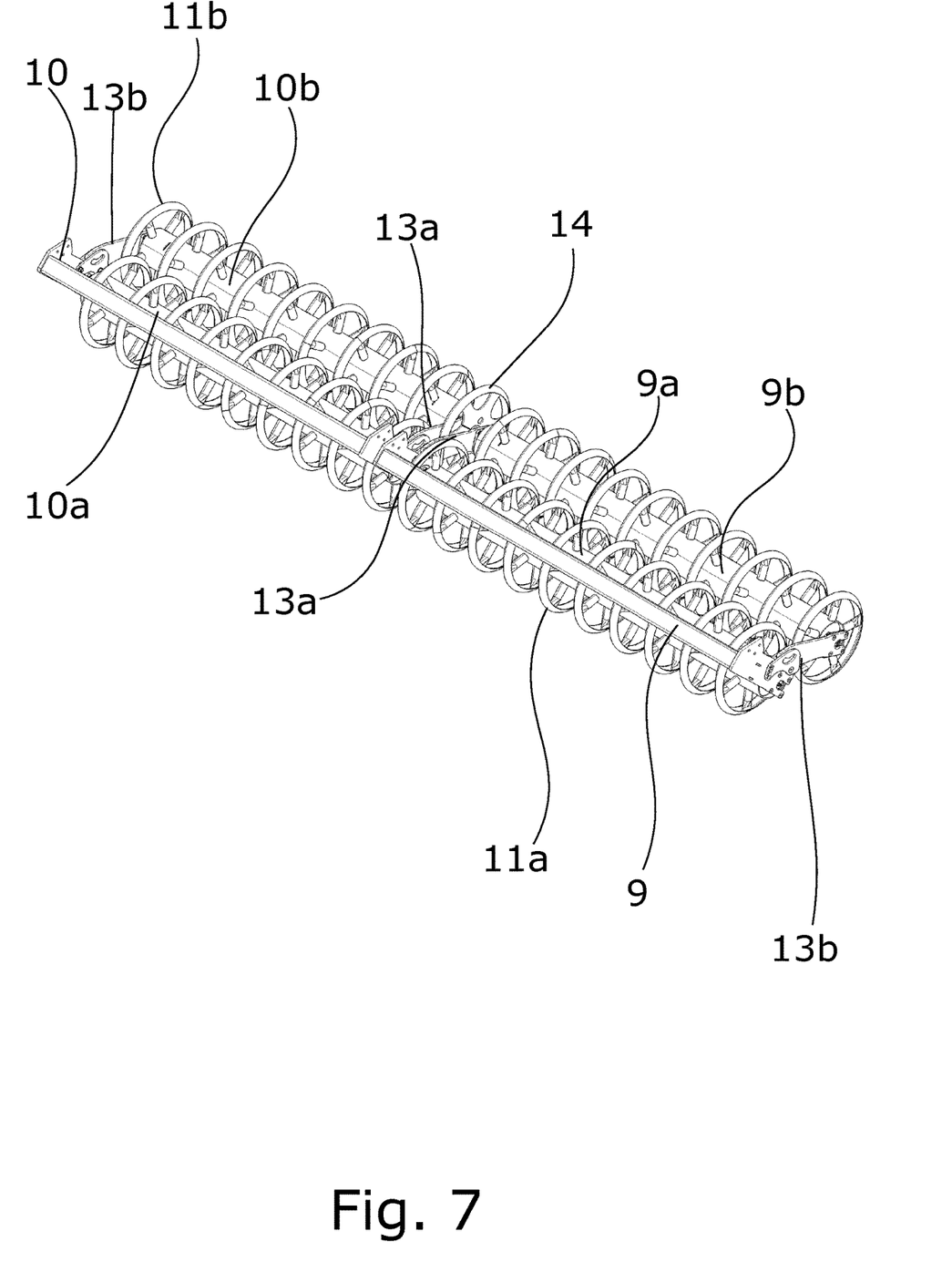
FIG. 7 shows a view of a whole of both sets of rollers of the agricultural device.
Figure 8:
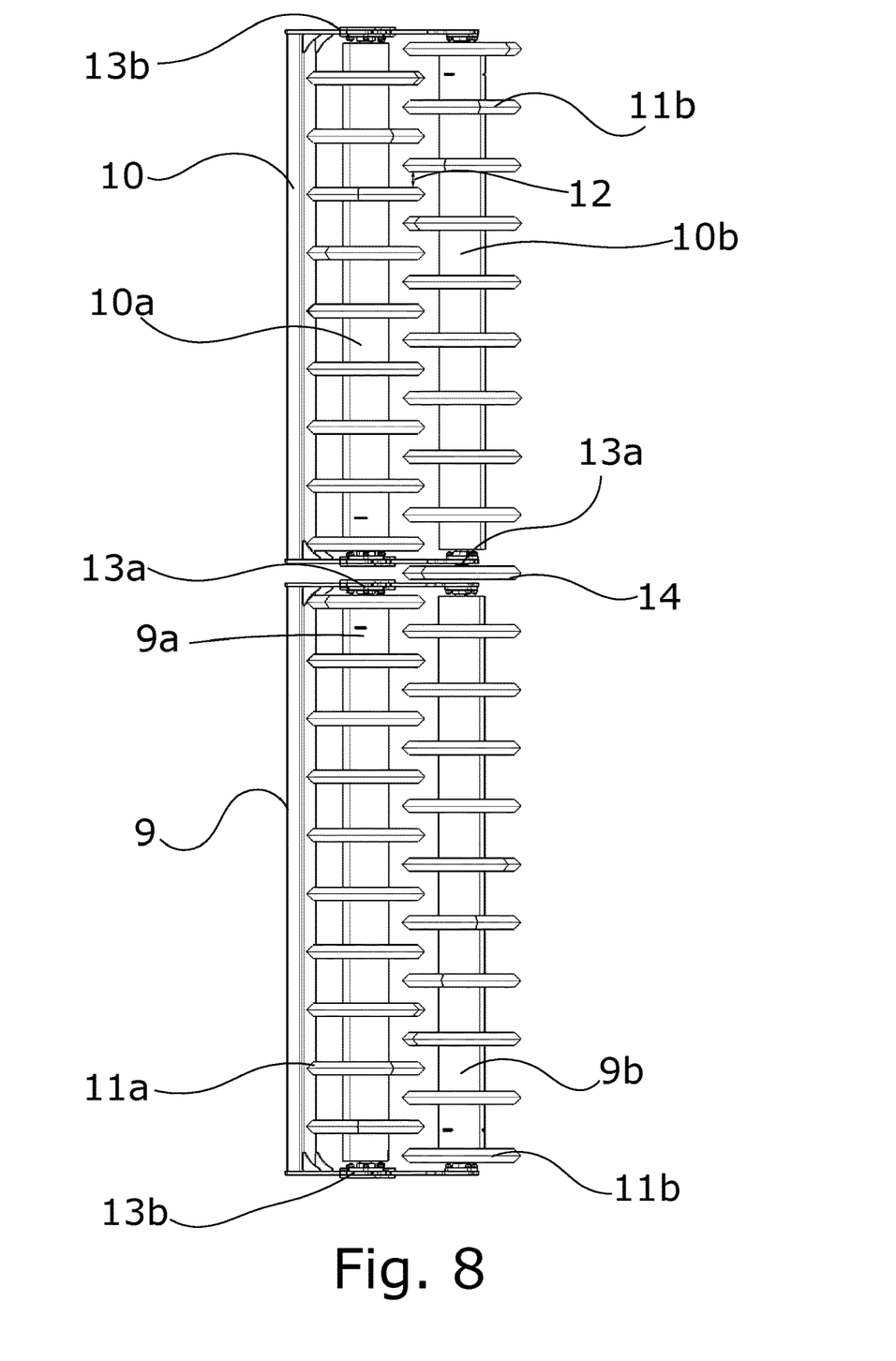
FIG. 8 shows a bottom view of a whole of both sets of rollers of the agricultural device.
Figure 9:
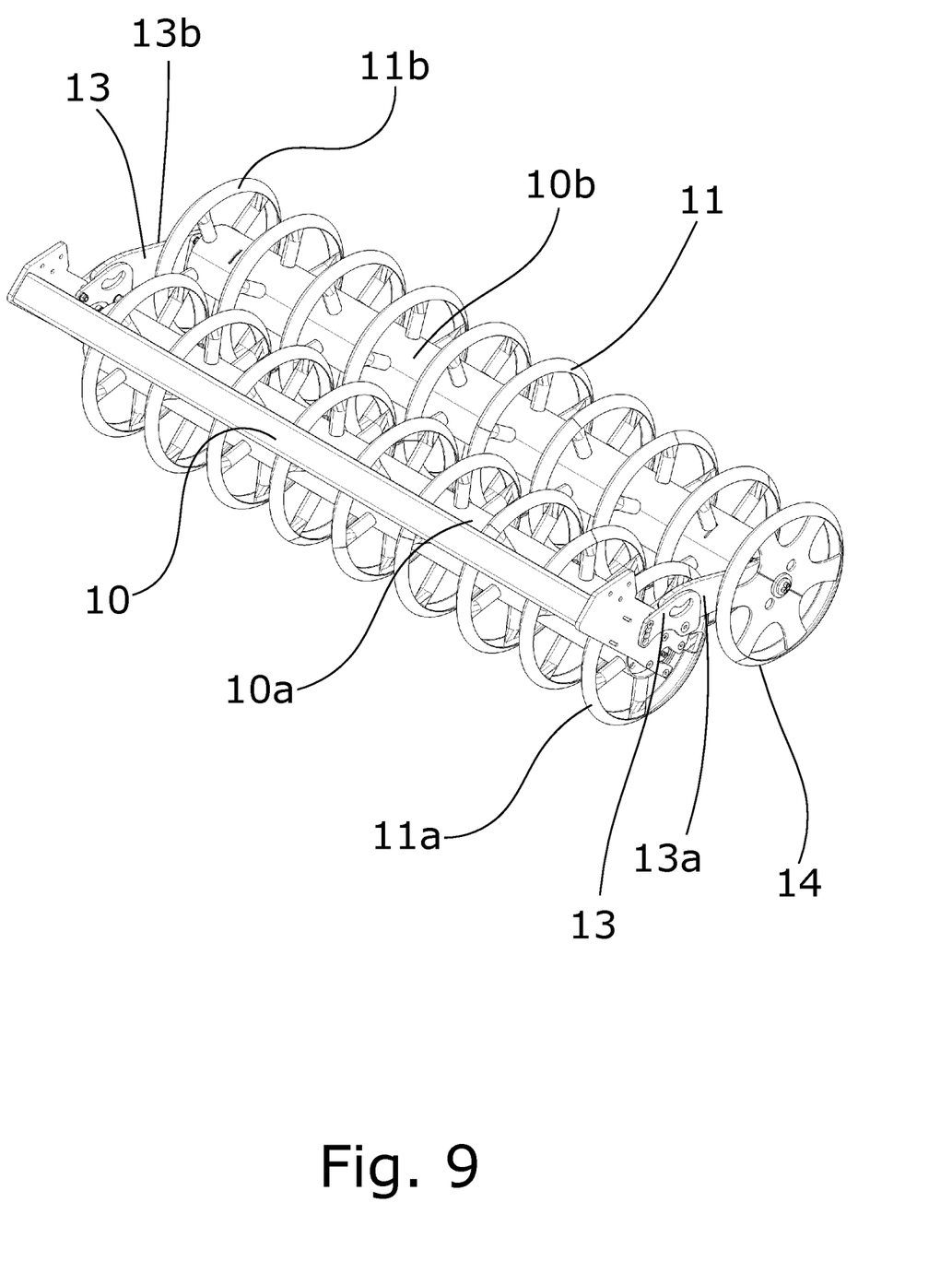
FIG. 9 shows the right set of rollers of the agricultural device with a disc mounted on the outer side of the attachment of the rollers.
Figure 10:
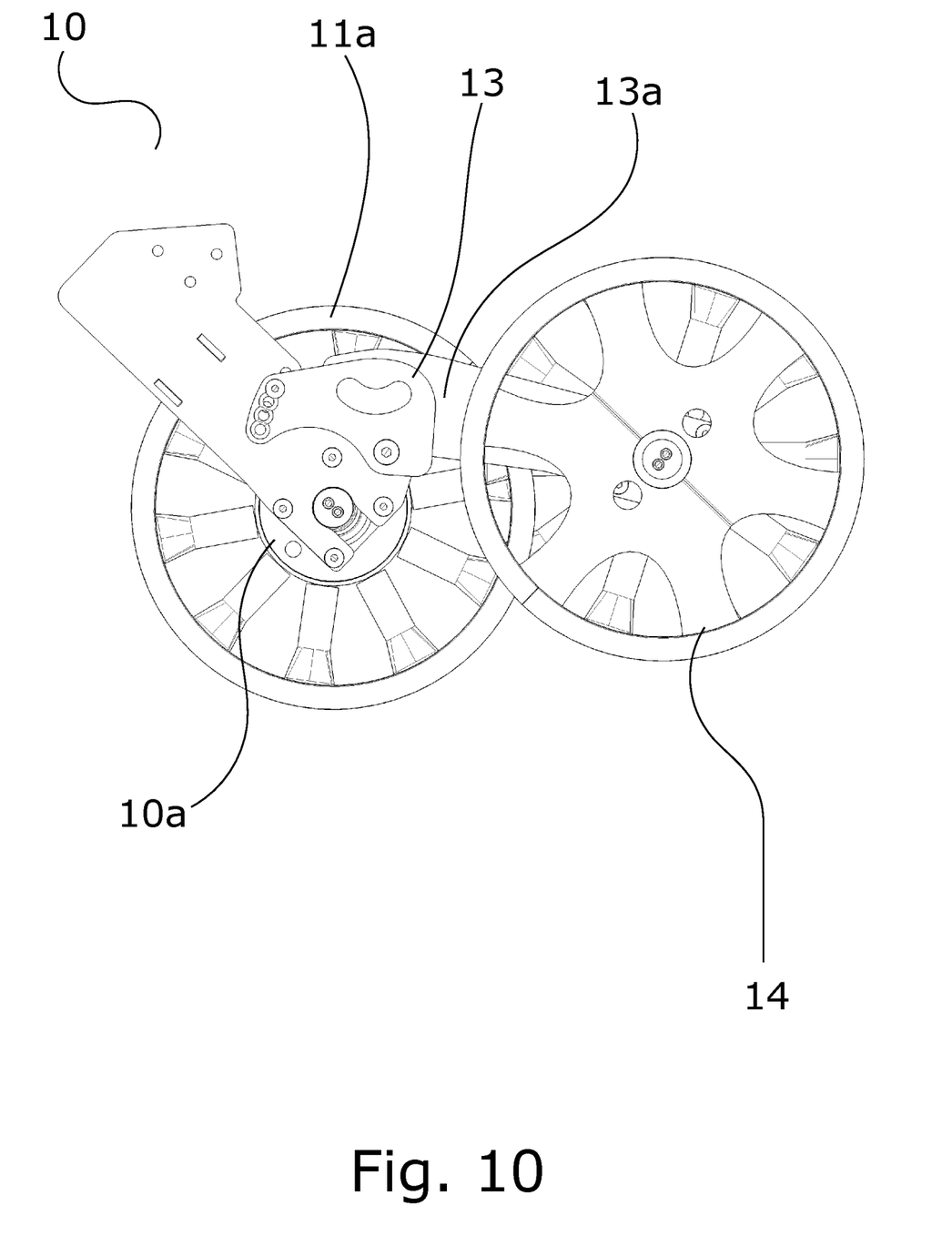
FIG. 10 shows a side view of the right set of rollers of the agricultural device with a disc mounted on the outer side of the attachment of the rollers and FIG. 11 shows a bottom view of the right set of rollers of the agricultural device with a disc mounted on the outer side of the attachment of the rollers.
Figure 11:
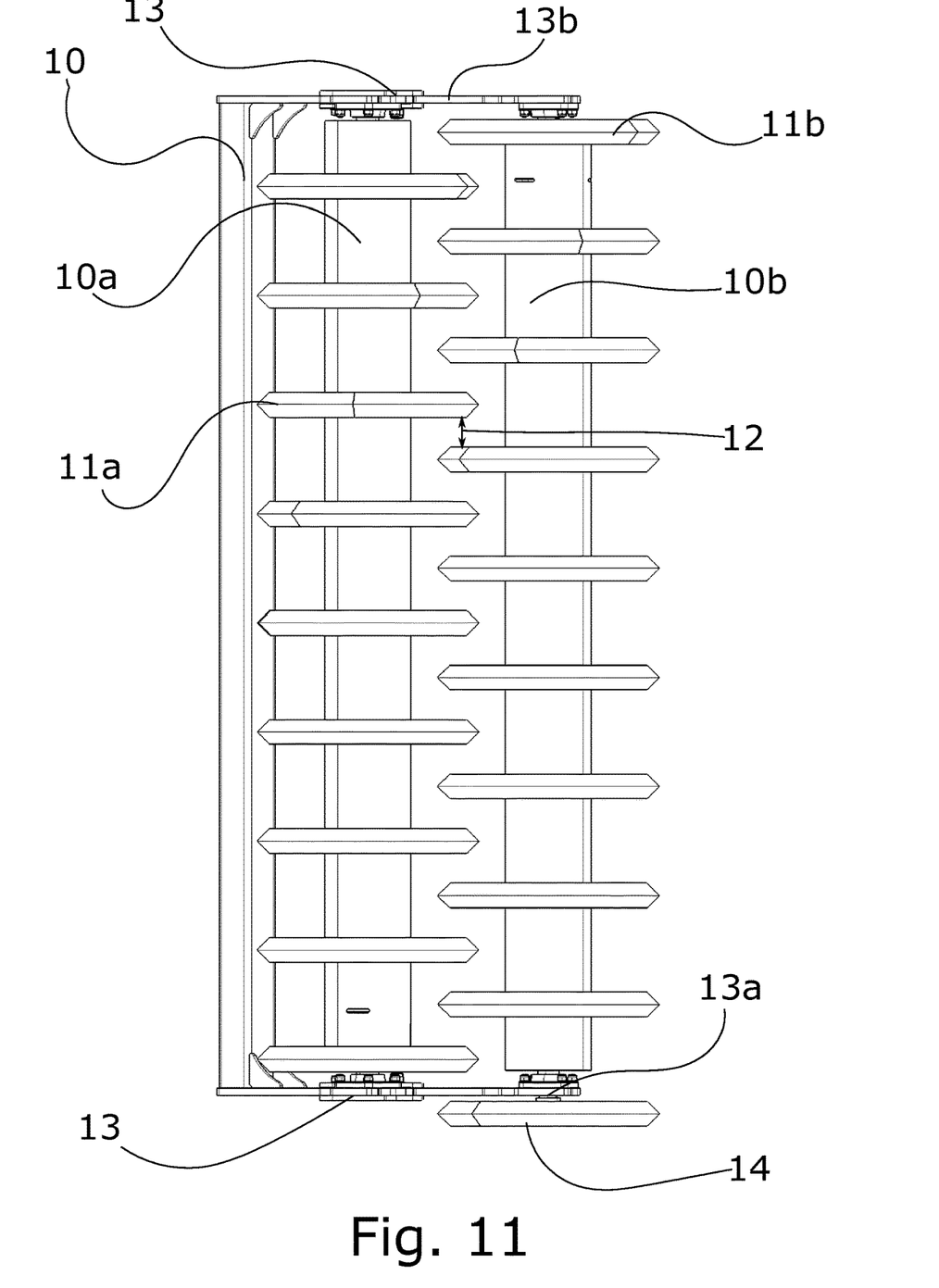

The agricultural device 1 shown in FIGS. 1, 2 and 3 comprises a supporting frame 2, which is further divided into a central part 3, a left wing 4 and a right wing 5, wherein the wings 4 and 5 are rotatably attached to the central part 3. Because of the rotatable mounting it is possible to fold the agricultural device 1 into a more compact form, which is important for subsequent transport of the agricultural device 1 on roads. The agricultural device 1 includes at least two rows 6 of working units 7, which are arranged in such a way that their mutual distance 14 is the same along the whole width of the agricultural device 1. In an exemplary embodiment of the invention, the agricultural device is provided with three rows 6 of working units 7. However, even multi-row arrangements with four, five and more sets 6 of working units 7 are possible. In an exemplary embodiment of the invention, the working unit 7 is a ploughshare, although other embodiments of the invention are possible with different working units 7 that are used for soil processing, e.g. by chisels.

Agricultural device 1 is further provided with two sets of rollers shown in FIG. 4-11, namely the left set of rollers 9 and the right set of rollers 10, wherein the left set of rollers 9 is considered to be the left set from the top view of the device 1 in the driving direction 1a and the right set of rollers 10 is considered to be the right set of rollers from the top view of the device 1 in the driving direction 1a, see FIG. 2. The left set of rollers 9 is attached to the left wing 4 and the right set of rollers 10 is attached to the right wing 5. The sets of rollers 9 and 10 are divided into the front roller 9a and 10a, the rear roller 9b and 10b and they are provided with attachments 13 along their sides, where the inner attachments 13a are located closer to the center of the agricultural device 1 and the outer attachments 13b are located further from the center of the agricultural device 1. The discs 11 are arranged between the attachments 13 of the rollers in such a way that the position of the discs 11a located on front rollers 9a and 10a correspond with the working units 7, see FIG. 2. The number of discs 11b located on rear rollers 9b and 10b differs by exactly one disc 11 from the number of discs 11a located on front rollers 9a and 10a, and they are located in such way that the mutual distance 12 of all discs 11 is the same along the whole width of the agricultural device 1. In an exemplary embodiment of the invention, the number of discs 11b on rear rollers 9b and 10b is higher by one disc 11 than the number of discs 11a on front rollers 9a and 10a. In another exemplary embodiment of the invention, the number of discs 11b on rear rollers 9b and 10b is lower by one disc 11 than the number of discs 11a on front rollers 9a and 10a. Because of this, the soil is evenly processed along the whole width of the agricultural device 1 and no gaps of unprocessed soil appear.

The sets of rollers 9 and 10 differ from each other, both in their length and in the number of discs 11, which are located on each set. In an exemplary embodiment of the invention, the right set of rollers 10 is longer than the left set of rollers 9 and extends beyond the central axis of the agricultural device 1 in its length. Other embodiments of the invention are possible when the left set of rollers 9 is longer than the right set of rollers 10 and extends beyond the central axis of the agricultural device 1 by its length.

In an exemplary embodiment of the invention, the left set of rollers 9 is provided with a disc 14 mounted to the inner attachment 13a. The distance of this disc 14 from the nearest discs 11 equals the mutual distance 12 of other discs 11. All discs 11 and the disc 14 attached to the inner attachment 13a are then arranged in regular distances 12 along the whole width of the agricultural device 1. The disc 14 mounted to the inner attachment 13a can then be located in such way that its position corresponds with the position of discs 11a of front rollers 9a and 10a. In another exemplary embodiment of the invention, the disc 14 mounted to the inner attachment 13a can then be located in such way that its position corresponds with the position of discs 11b of rear rollers 9b and 10b.

Other embodiments of the invention are possible when the right set of rollers 10 is provided with a disc 14 mounted to the inner attachment 13a. The distance of this disc 14 from the nearest discs 11 equals the mutual distance 12 of other discs 11. All discs 11 and the disc 14 mounted to the inner attachment 13a are then arranged in regular distances 12 along the whole width of the agricultural device 1.

In other exemplary embodiments of the invention, when the left set of rollers 9 is longer than the right set of rollers 10 and is provided with a higher number of discs 11, arrangement of the disc 14 attached to the inner attachment 13a by the left set of rollers 9 is possible. The distance of this disc 14 from the nearest discs 11 equals the mutual distance 12 of other discs 11. All discs 11 and the disc 14 attached from the outside 13a of the attachment 13 are then arranged in regular distances 12 along the whole width of the agricultural device 1. Other embodiments of the invention are possible, in which the right set of rollers 10 provided with a disc 14 is attached to the inner attachment 13a. The distance of this disc 14 from the nearest discs 11 equals the mutual distance 12 of other discs 11. All discs 11 and the disc 14 attached to the inner attachment 13a are then arranged in regular distances 12 along the whole width of the agricultural device 1.

In an exemplary embodiment of the invention, a total number of nineteen working units 7 on the agricultural device 1 is arranged in three rows 6. This corresponds with the total number of thirty-nine discs 11 and 14 located on rear rollers 9 and 10.

In an exemplary embodiment of the invention, the agricultural device 1 is provided with two wheels 8, which make transport of the agricultural device on roads easier. However, other embodiments of the invention without transport wheels or with a different number of wheels 8 are possible.

A device according to this invention can be used for agricultural devices that use discs located on rear rollers for compacting processed soil.

LIST OF REFERENCE SIGNS

1—agricultural device
1a—driving direction of the agricultural device
2—supporting frame
3—central part of the supporting frame
4—left wing of the supporting frame
5—right wing of the supporting frame
6—row of working units
7—working unit
8—wheels (not shown)
9—left set of rollers
9a—front roller of left set
9b—rear roller of left set
10—right set of rollers
10a—front roller of right set
10b—rear roller of right set
11—disc
11a—front roller disc
11b—rear roller disc
12—distance between the discs
13—attachments of sets of rollers
13a—inner attachment
13b—outer attachment 14—disc mounted to inner attachment
15—distance between working units

What is claimed is:

1. An agricultural device for soil processing with two sets of working rollers comprising a supporting frame which comprises a central part, a left wing and a right wing, wherein the left and right wings are rotatably attached to the central part, at least two rows of working units attached to the supporting frame, wherein the working units are arranged in regular distances in every row, a left set of rollers attached to the left wing and a right set of rollers attached to the right wing, wherein the sets of rollers are divided into a front roller and a rear roller, wherein these sets of rollers are provided with attachments and discs, wherein the discs on sets are located between these attachments, wherein the number of discs of rear rollers differs from the number of discs of front rollers exactly by one disc, wherein the distances between the individual discs are the same along the whole width of the agricultural device, and wherein the discs of front rollers are located in the same plane as the working units.

2. The agricultural device for soil processing with two sets of working rollers according to claim 1, wherein the left set of rollers and the right set of rollers have different number of discs and a different length.

3. The agricultural device for soil processing with two sets of working rollers according to claim 1, wherein the working unit is a ploughshare or a chisel.

4. The agricultural device for soil processing with two sets of working rollers according to claim 1, wherein the total number of discs is thirty-nine and the number of working units is nineteen.

5. The agricultural device for soil processing with two sets of working rollers according to claim 1, wherein it is provided with three rows of working units.

6. The agricultural device for soil processing with two sets of working rollers according to claim 1, wherein it is provided with at least one wheel.

* * * * *